United States Patent
Edamadaka et al.

(10) Patent No.: US 11,765,109 B2
(45) Date of Patent: Sep. 19, 2023

(54) METHOD AND SYSTEM FOR PROVIDING RESILIENCY IN INTERACTION SERVICING ACROSS DATA CENTERS

(71) Applicant: JPMorgan Chase Bank, N.A., New York, NY (US)

(72) Inventors: Rajeshwari Edamadaka, Allentown, NJ (US); Diarmuid Leonard, Galway (IE)

(73) Assignee: JPMORGAN CHASE BANK, N.A., New York, NY (US)

( * ) Notice: Subject to any disclaimer, the term of this patent is extended or adjusted under 35 U.S.C. 154(b) by 345 days.

(21) Appl. No.: 17/089,093

(22) Filed: Nov. 4, 2020

(65) Prior Publication Data

US 2021/0383404 A1 Dec. 9, 2021

Related U.S. Application Data

(60) Provisional application No. 63/036,752, filed on Jun. 9, 2020.

(51) Int. Cl.
*G06Q 30/00* (2023.01)
*G06F 7/08* (2006.01)
(Continued)

(52) U.S. Cl.
CPC .............. *H04L 51/046* (2013.01); *G06F 7/08* (2013.01); *G06F 8/70* (2013.01); *G06F 9/451* (2018.02); *G06F 9/4881* (2013.01); *G06F 9/505* (2013.01); *G06F 9/5072* (2013.01); *G06F 9/5077* (2013.01); *G06F 9/5083* (2013.01); *G06F 9/542* (2013.01); *G06F 9/546* (2013.01); *G06F 9/547* (2013.01); *G06F 11/1464* (2013.01); *G06F 11/3612* (2013.01); *G06Q 10/04* (2013.01); (Continued)

(58) Field of Classification Search
None
See application file for complete search history.

(56) References Cited

U.S. PATENT DOCUMENTS

| | | | | |
|---|---|---|---|---|
| 10,824,474 B1 * | 11/2020 | Kamboj | ................ | G06F 9/5038 |
| 2013/0124807 A1 * | 5/2013 | Nielsen | ............... | G06F 11/1482 |
| | | | | 711/E12.103 |

(Continued)

Primary Examiner — Harry S Hong
(74) Attorney, Agent, or Firm — GREENBLUM & BERNSTEIN, P.L.C.

(57) ABSTRACT

A system and a method for overcoming a partial failure of an application in a telephony communication system are provided. The method includes: receiving information indicating that a first application has experienced a partial failure; receiving, from each of a plurality of applications, metadata that relates to a corresponding ordered priority of partitions, a corresponding Availability Zone from among a plurality of Availability Zones in which the respective application is located, and a corresponding instance index within the corresponding Availability Zone; sorting the received metadata with respect to the corresponding Availability Zone and with respect to the corresponding instance index; and reassigning, based on a result of the sorting, the first application to an instance index within the Availability Zone in which the first application is located such that a number of the partitions within instance indexes in the corresponding Availability Zone is balanced.

8 Claims, 13 Drawing Sheets

(51) Int. Cl.
| | |
|---|---|
| *G06F 11/36* | (2006.01) |
| *H04M 3/42* | (2006.01) |
| *H04M 3/51* | (2006.01) |
| *H04L 51/046* | (2022.01) |
| *H04L 45/121* | (2022.01) |
| *G06Q 10/10* | (2023.01) |
| *G06F 11/14* | (2006.01) |
| *G06F 9/48* | (2006.01) |
| *G06Q 30/016* | (2023.01) |
| *G06F 9/54* | (2006.01) |
| *G06F 9/451* | (2018.01) |
| *G06F 8/70* | (2018.01) |
| *G09G 5/377* | (2006.01) |
| *G06F 9/50* | (2006.01) |
| *H04M 7/00* | (2006.01) |
| *G06Q 10/04* | (2023.01) |
| *G06Q 30/02* | (2023.01) |
| *H04L 9/08* | (2006.01) |
| *H04L 9/32* | (2006.01) |
| *H04L 67/14* | (2022.01) |
| *H04L 67/55* | (2022.01) |
| *H04L 67/63* | (2022.01) |
| *H04L 67/562* | (2022.01) |
| *H04L 67/564* | (2022.01) |
| *H04M 3/436* | (2006.01) |
| *H04M 3/50* | (2006.01) |
| *G06Q 10/20* | (2023.01) |

(52) U.S. Cl.
CPC ......... *G06Q 10/103* (2013.01); *G06Q 30/016* (2013.01); *G06Q 30/0281* (2013.01); *G09G 5/377* (2013.01); *H04L 9/0869* (2013.01); *H04L 9/3242* (2013.01); *H04L 45/121* (2013.01); *H04L 67/14* (2013.01); *H04L 67/55* (2022.05); *H04L 67/562* (2022.05); *H04L 67/564* (2022.05); *H04L 67/63* (2022.05); *H04M 3/42042* (2013.01); *H04M 3/4365* (2013.01); *H04M 3/50* (2013.01); *H04M 3/5183* (2013.01); *H04M 3/5191* (2013.01); *H04M 7/0054* (2013.01); *G06F 2201/805* (2013.01); *G06F 2209/503* (2013.01); *G06F 2209/505* (2013.01); *G06F 2209/508* (2013.01); *G06Q 10/20* (2013.01); *G09G 2354/00* (2013.01)

(56) References Cited

U.S. PATENT DOCUMENTS

2017/0317932 A1* 11/2017 Paramasivam ....... G06F 9/5083
2019/0312979 A1* 10/2019 Sharma ............. H04M 3/42178

\* cited by examiner

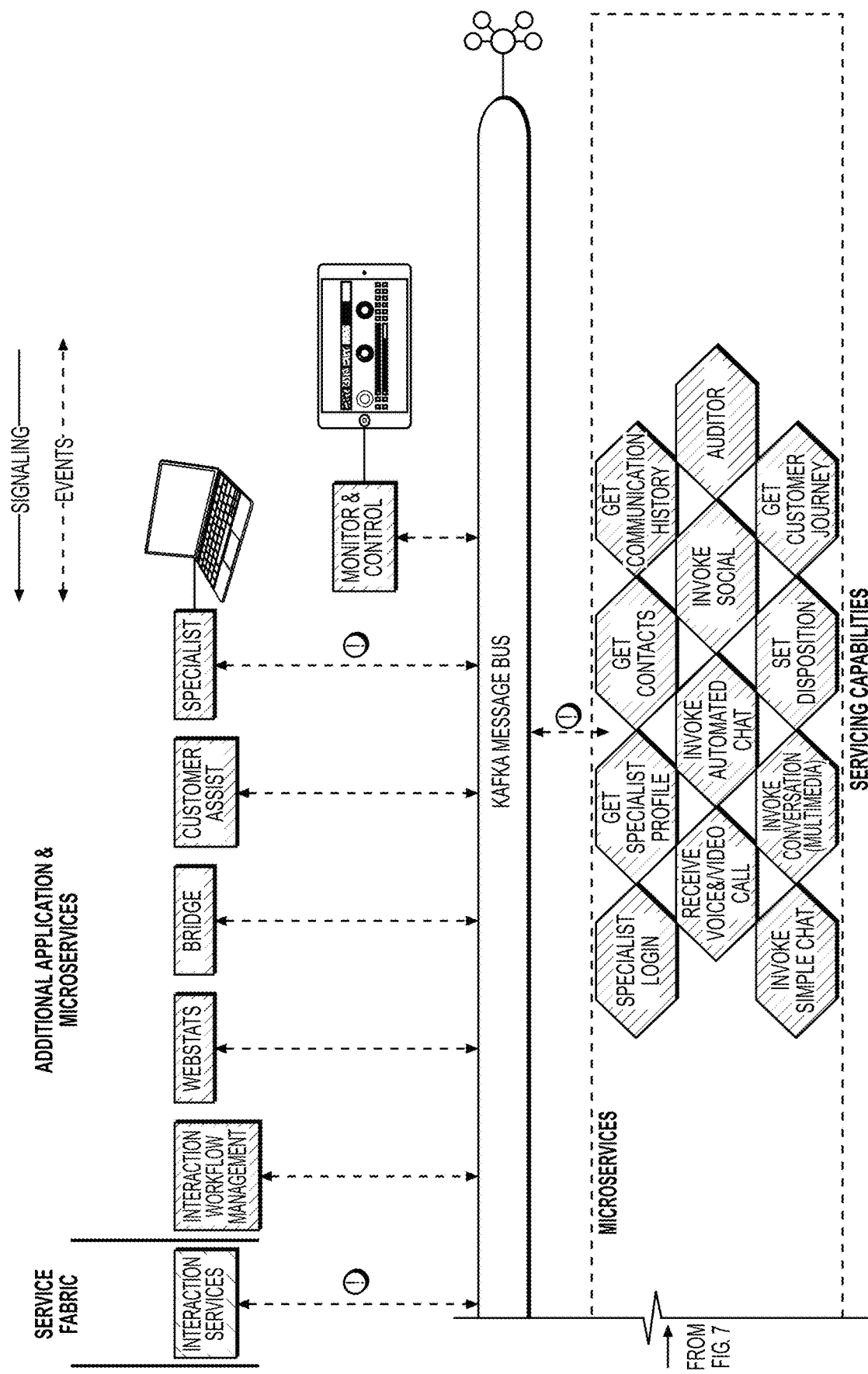

METHOD AND SYSTEM FOR PROVIDING RESILIENCY IN INTERACTION SERVICING ACROSS DATA CENTERS

CROSS-REFERENCE TO RELATED APPLICATIONS

This application claims the benefit of U.S. Provisional Patent Application Ser. No. 63/036,752, filed Jun. 9, 2020, which is hereby incorporated by reference in its entirety.

This application is being filed concurrently on Nov. 4, 2020 with each of U.S. patent application Ser. No. 17/089,275, entitled "Method and System for Interaction Servicing"; U.S. patent application Ser. No. 17/089,305, entitled "Method and System for Interaction Servicing with Embeddable Ribbon Display"; U.S. patent application Ser. No. 17/089,302, entitled "Method and System for Resolving Producer and Consumer Affinities in Interaction Servicing"; U.S. patent application Ser. No. 17/089,311, entitled "Method and System for Providing Resiliency in Interaction Servicing"; U.S. patent application Ser. No. 17/089,061, entitled "Method and System for Providing Resiliency in Interaction Servicing Across Data Centers"; U.S. patent application Ser. No. 17/089,093, entitled "Method and System for Providing Resiliency in Interaction Servicing Across Data Centers"; and U.S. patent application Ser. No. 17/089,145, entitled "Method and System for Providing High Efficiency, Bidirectional Messaging for Low Latency Applications," the contents of each of which is hereby incorporated by reference in its respective entirety.

BACKGROUND

1. Field of the Disclosure

This technology generally relates to methods and systems for performing customer service interactions, and more particularly to methods and systems for integrating and streamlining large number of customer service interactions to ensure efficient and accurate interaction servicing results.

2. Background Information

For a large corporate organization that has many customers, customer service is an important aspect of the business operation. Customers typically expect service requests to be handled in a timely and accurate manner, and if the corporate organization fails to provide such customer service, there may be a negative effect on the reputation of that organization.

Many customer service requests are performed online via the Internet. For such requests, it is important that the request be assessed and routed to the correct entity within the corporate organization, together with all of the relevant information that will be needed by the entity that will handle the request. However, the proper routing and handling of such requests may be complicated when the number of requests is large and the size of the corporate organization is large.

Accordingly, there is a need for a tool that integrates and streamlines the processing of customer service interactions in order to ensure efficient and accurate handling and resolution thereof.

SUMMARY

The present disclosure, through one or more of its various aspects, embodiments, and/or specific features or sub-components, provides, inter alia, various systems, servers, devices, methods, media, programs, and platforms for handling large number of customer service interactions to ensure efficient and accurate interaction servicing results.

According to an aspect of the present disclosure, a method for servicing a plurality of interactions with users is provided. The method is implemented by at least one processor. The method includes: receiving, by the at least one processor from each respective user, a respective request for a corresponding interaction; obtaining, by the at least one processor for each interaction, request-specific information that relates to the received respective request and user-specific information that relates to the respective user; analyzing, by the at least one processor for each interaction, the request-specific information to determine at least one corresponding microservice that is usable for handling the interaction; and routing, by the at least one processor for each interaction, the request-specific information and the user-specific information to a respective destination that relates to the determined at least one corresponding microservice.

The method may further include receiving, by the at least one processor from the at least one corresponding microservice, response information that relates to a response to the respective request for the corresponding interaction.

The method may further include displaying, by the at least processor for at least one interaction, a screen that includes at least a subset of the request-specific information, at least a subset of the user-specific information, and status information that relates to a status of the response to the respective request for the at least one interaction.

The method may further include determining, for each interaction, a request type for each respective request, the request type including at least one from among a voice request, an email request, an online chat request, a browser request, and a click-to-call request.

The analyzing may further include analyzing the request-specific information to determine at least two corresponding microservices that are usable for handling the corresponding interaction.

The method may further include determining at least two separate routes having at least two different destinations that correspond to the determined at least two corresponding microservices; and using at least one metric that relates to a workload distribution to select an optimum route from among the determined at least two separate routes. The routing may further include using the selected optimum route.

According to another exemplary embodiment, a method for overcoming a partial failure of an application in a telephony communication system is provided. The method is implemented by at least one processor. The method includes: receiving, by the at least one processor, information indicating that a first application from among a plurality of applications has experienced a partial failure; receiving, by the at least one processor from each respective application of the plurality of applications, metadata that relates to a corresponding ordered priority of partitions, a corresponding Availability Zone from among a plurality of Availability Zones in which the respective application is located, and a corresponding instance index within the corresponding Availability Zone; sorting, by the at least one processor, the received metadata with respect to the corresponding Availability Zone and with respect to the corresponding instance index; and reassigning, by the at least one processor based on a result of the sorting, the first application to an instance index within the Availability Zone in which the first application is located such that a number of the partitions within instance indexes in the corresponding Availability Zone is balanced.

The reassigning may include: determining whether each of the partitions is assigned to an Availability Zone; and when a determination is made that a particular partition is not assigned to an Availability Zone, assigning the particular partition to a particular Availability Zone.

The assigning of the particular partition to the particular Availability Zone may include calculating a modulo value with respect to an identification number of the particular partition and a number of Availability Zones within the plurality of Availability Zones.

The method may further include: after the particular partition is assigned to the particular Availability Zone, assigning the particular partition to a particular instance index within the particular Availability Zone.

According to yet another exemplary embodiment, a method for overcoming a partial failure of an application in a telephony communication system is provided. The method is implemented by at least one processor. The method includes: receiving, by the at least one processor from a user, a service request; updating, by the at least one processor, a first counter that relates to a number of received service requests; attempting, by the at least one processor, to process the received service request; when the service request is successfully processed, updating, by the at least one processor, a second counter that relates to a number of successfully processed service requests; and when the service request is not successfully processed, updating, by the at least one processor, a third counter that relates to a number of failed service requests, and transmitting, to the user a message indicating that the service request is not successfully processed.

The method may further include transmitting, to the user, information that relates to a number of failed service requests within a predetermined time interval.

The method may further include transmitting, to the user, information that relates to a number of successfully processed service requests within a predetermined time interval and information that relates to a number of failed service requests within the predetermined time interval.

The predetermined time interval may include at least one from among a most recent minute prior to the transmitting, a most recent ten minutes prior to the transmitting, a most recent hour prior to the transmitting, and a most recent day prior to the transmitting.

The method may further include: using the information that relates to the number of successfully processed service requests within the predetermined time interval and the information that relates to the number of failed service requests within the predetermined time interval to calculate a metric that relates to a health of a corresponding instance index within an Availability Zone; comparing the calculated metric with a corresponding metric that relates to a health of at least one other instance index within the Availability Zone; and determining whether to self-terminate based on a result of the comparing.

The determining whether to self-terminate may include: computing a difference between the calculated metric and the corresponding metric; and comparing the computed difference with a predetermined threshold value.

The method may further include: when a determination is made to self-terminate, restarting after a predetermined restart interval has elapsed subsequent to the self-termination.

According to still another exemplary embodiment, a computing apparatus for overcoming a partial failure of an application in a telephony communication system. The computing apparatus includes: a processor; a memory; and a communication interface coupled to each of the processor and the memory. The processor is configured to: receive, via the communication interface, information indicating that a first application from among a plurality of applications has experienced a partial failure; receive, via the communication interface from each respective application of the plurality of applications, metadata that relates to a corresponding ordered priority of partitions, a corresponding Availability Zone from among a plurality of Availability Zones in which the respective application is located, and a corresponding instance index within the corresponding Availability Zone; sort the received metadata with respect to the corresponding Availability Zone and with respect to the corresponding instance index; and reassign, based on a result of the sorting, the first application to an instance index within the Availability Zone in which the first application is located such that a number of the partitions within instance indexes in the corresponding Availability Zone is balanced.

The processor may be further configured to: determine whether each of the partitions is assigned to an Availability Zone; and when a determination is made that a particular partition is not assigned to an Availability Zone, assign the particular partition to a particular Availability Zone.

The processor may be further configured to assign the particular partition to the particular Availability Zone by calculating a modulo value with respect to an identification number of the particular partition and a number of Availability Zones within the plurality of Availability Zones.

The processor may be further configured to: after the particular partition is assigned to the particular Availability Zone, assign the particular partition to a particular instance index within the particular Availability Zone.

BRIEF DESCRIPTION OF THE DRAWINGS

The present disclosure is further described in the detailed description which follows in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
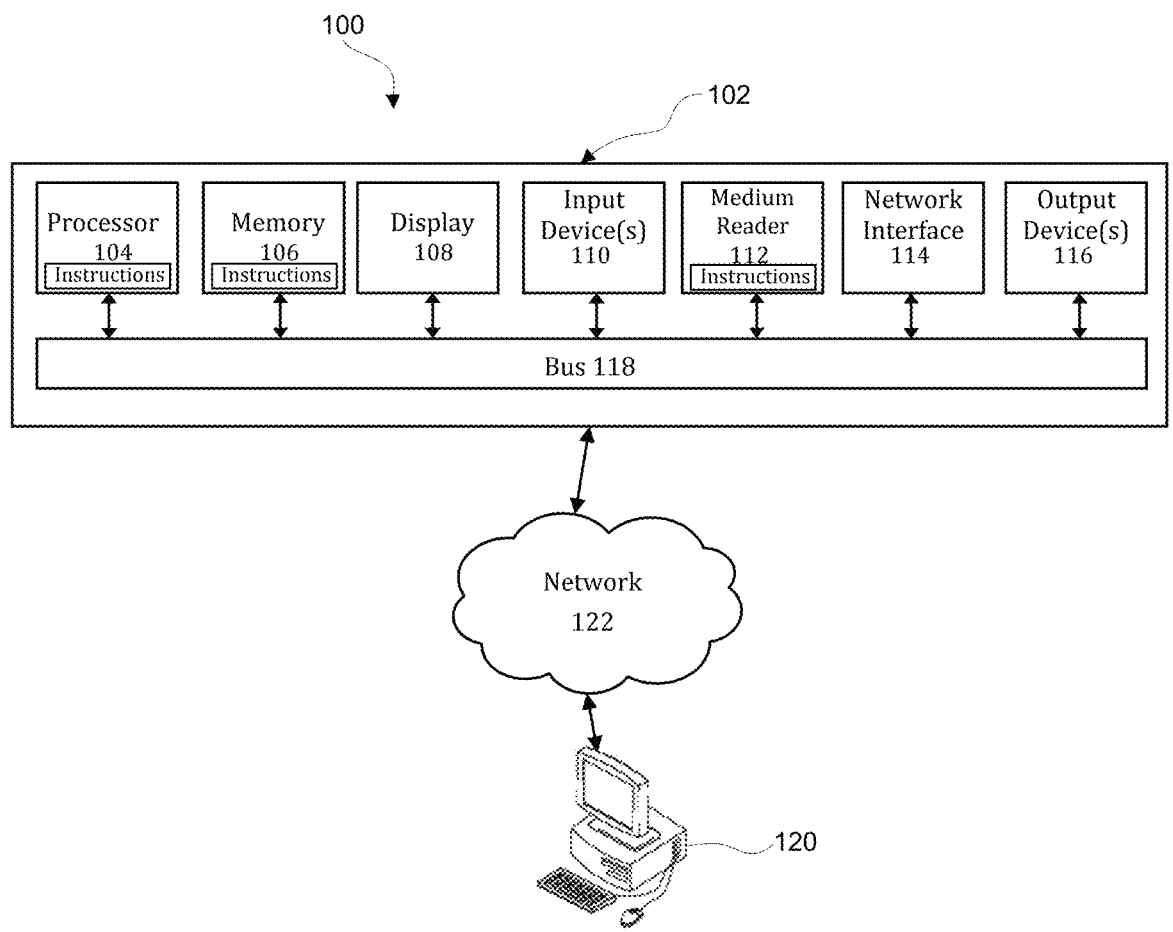
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OILED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 1219 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for handling large number of customer service interactions to ensure efficient and accurate interaction servicing results.

Figure 2:
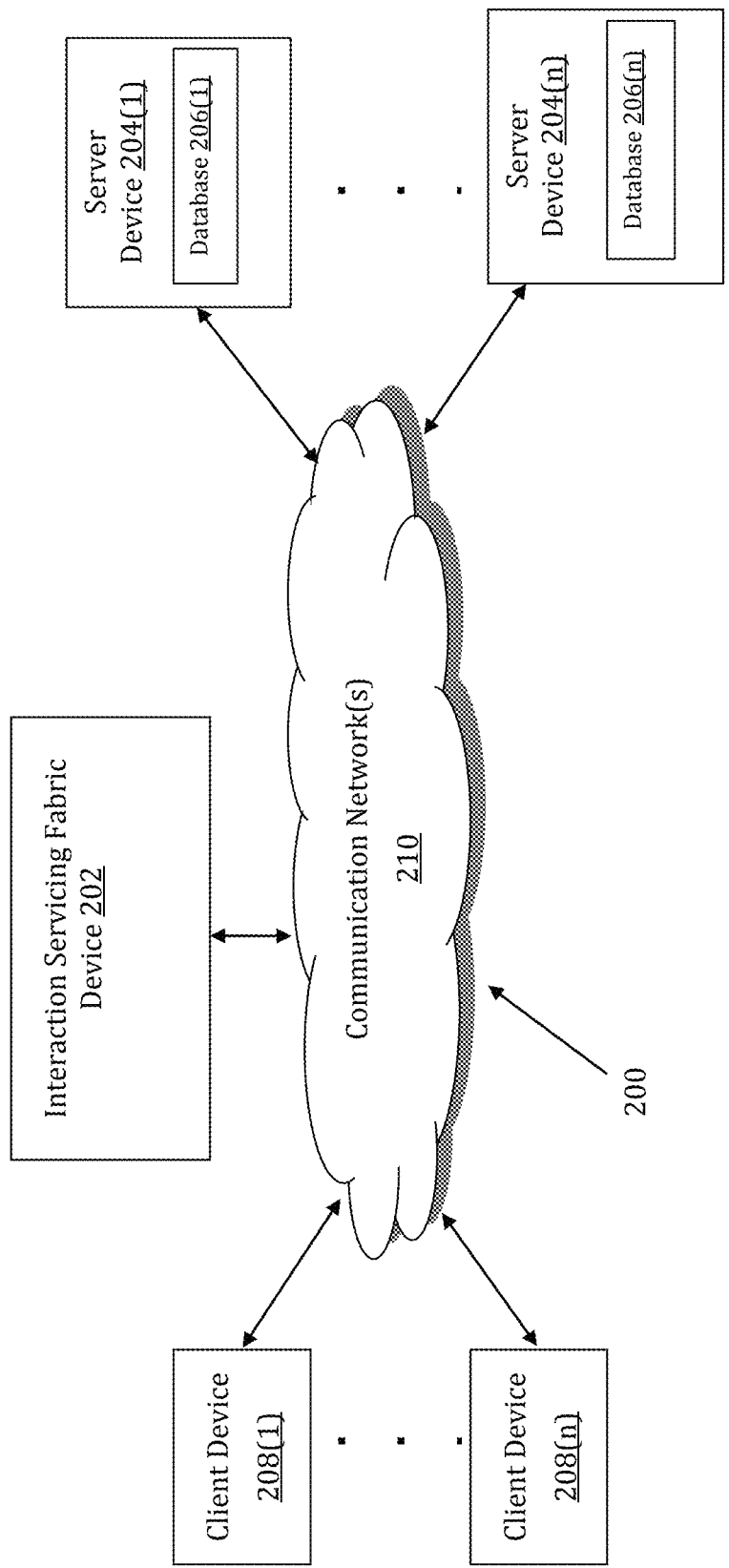
FIG. 2 illustrates an exemplary diagram of a network environment.

Referring to FIG. 2, a schematic of an exemplary network environment 200 for implementing a method for handling large number of customer service interactions to ensure efficient and accurate interaction servicing results is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for handling large number of customer service interactions to ensure efficient and accurate interaction servicing results may be implemented by an Interaction Servicing Fabric (ISF) device 202. The ISF device 202 may be the same or similar to the computer system 102 as described with respect to FIG. 1. The ISF device 202 may store one or more applications that can include executable instructions that, when executed by the ISF device 202, cause the ISF device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ISF device 202 itself, may be located in virtual server(s) running in a cloud-based computing environment rather than being tied to one or more specific physical network computing devices. Also, the application(s) may be running in one or more virtual machines (VMs) executing on the ISF device 202. Additionally; in one or more embodiments of this technology, virtual machine(s) running on the ISF device 202 may be managed or supervised by a hypervisor.

In the network environment 200 of FIG. 2, the ISF device 202 is coupled to a plurality of server devices 204(1)-204(n) that hosts a plurality of databases 206(1)-206(n), and also to a plurality of client devices 208(1)-208(n) via communication network(s) 210. A communication interface of the ISF device 202, such as the network interface 114 of the computer system 102 of FIG. 1, operatively couples and communicates between the ISF device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ISF device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ISF devices that efficiently implement methods and systems for handling large number of customer service interactions to ensure efficient and accurate interaction servicing results.

By way of example only the communication network(s) 210 may include local area network(s) (LANs)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ISF device 202 may be a standalone device or integrated with one or more other devices or apparatuses, such as one or more of the server devices 204(1)-204(n), for example. In one particular example, the ISF device 202 may include or be hosted by one of the server devices 204(1)-204(n), and other arrangements are also possible. Moreover, one or more of the devices of the ISF device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ISF device 202 via the communication network(s) 210 according to the HTTP-based and/or JavaScript Object Notation (JON) protocol, for example, although other protocols may also be used.

The sewer devices 204(1)-204(n) may be hardware or software or may represent a system with multiple servers in an Availability Zone, which may include internal or external networks. The server devices 204(1)-204(n) hosts the databases 206(1)-206(n) that are configured to store data that relates to user requests, identification information that relates to individual users, and microservices that are used for resolving user requests.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ISF device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ISF device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ISF device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ISF device 202, the server devices 204(1)-204(n), or the client devices 208(1)-208(n), for example, may be configured to operate as virtual instances on the same physical machine. In other words, one or more of the ISF device 202, the server devices 204(1)-204(n), or the client devices 208(1)-208(n) may operate on the same physical device rather than as separate devices communicating through communication network(s) 210. Additionally, there may be more or fewer ISF devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
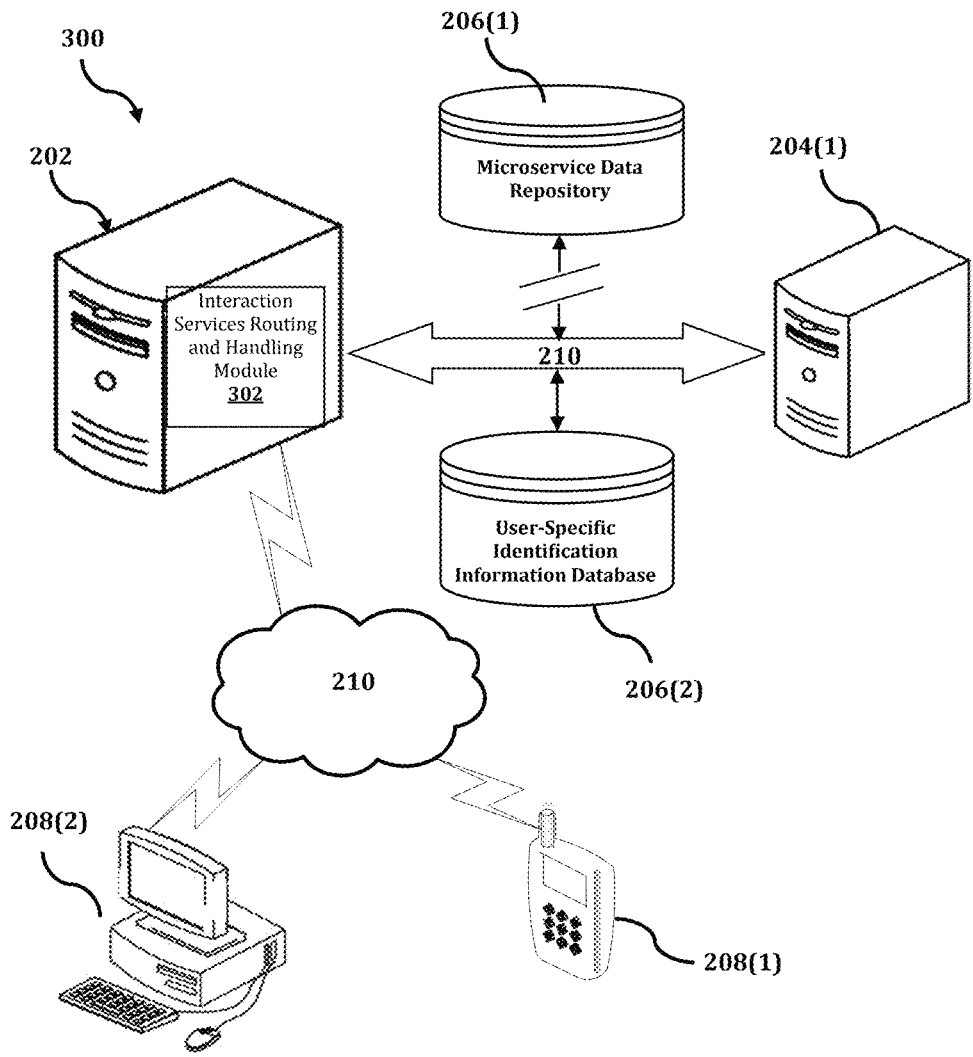
FIG. 3 shows an exemplary system for implementing a method for handling large number of customer service interactions to ensure efficient and accurate interaction servicing results.

The ISF device 202 is described and illustrated in FIG. 3 as including an interaction services routing and handling module 302, although it may include other rules, policies, modules, databases, or applications, for example. As will be described below, the interaction services routing and handling module 302 is configured to implement a method for handling large number of customer service interactions to ensure efficient and accurate interaction servicing results.

An exemplary process 300 for implementing a mechanism for handling large number of customer service interactions to ensure efficient and accurate interaction servicing results by utilizing the network environment of FIG. 2 is illustrated as being executed in FIG. 3. Specifically, a first client device 208(1) and a second client device 208(2) are illustrated as being in communication with ISF device 202. In this regard, the first client device 208(1) and the second client device 208(2) may be "clients" of the ISF device 202 and are described herein as such. Nevertheless, it is to be known and understood that the first client device 208(1) and/or the second client device 208(2) need not necessarily be "clients" of the ISF device 202, or any entity described in association therewith herein.

Any additional or alternative relationship may exist between either or both of the first client device 208(1) and the second client device 208(2) and the ISF device 202, or no relationship may exist. For example, the ISF device 202 and the first client device 208(1) may be configured as the same physical device.

Further, ISF device 202 is illustrated as being able to access a microservices data repository 206(1) and a user-specific identification information database 206(2). The interaction services routing and handling module 302 may be configured to access these databases for implementing a method for handling large number of customer service interactions to ensure efficient and accurate interaction servicing results.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ISF device 202 via broadband or cellular communication. Alternatively, the process may be executed by the ISF device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the ISF device 202 executes a process for handling large number of customer service interactions to ensure efficient and accurate interaction servicing results. An exemplary process for handling large number of customer service interactions to ensure efficient and accurate interaction servicing results is generally indicated at flowchart 400 in FIG. 4.

Figure 4:
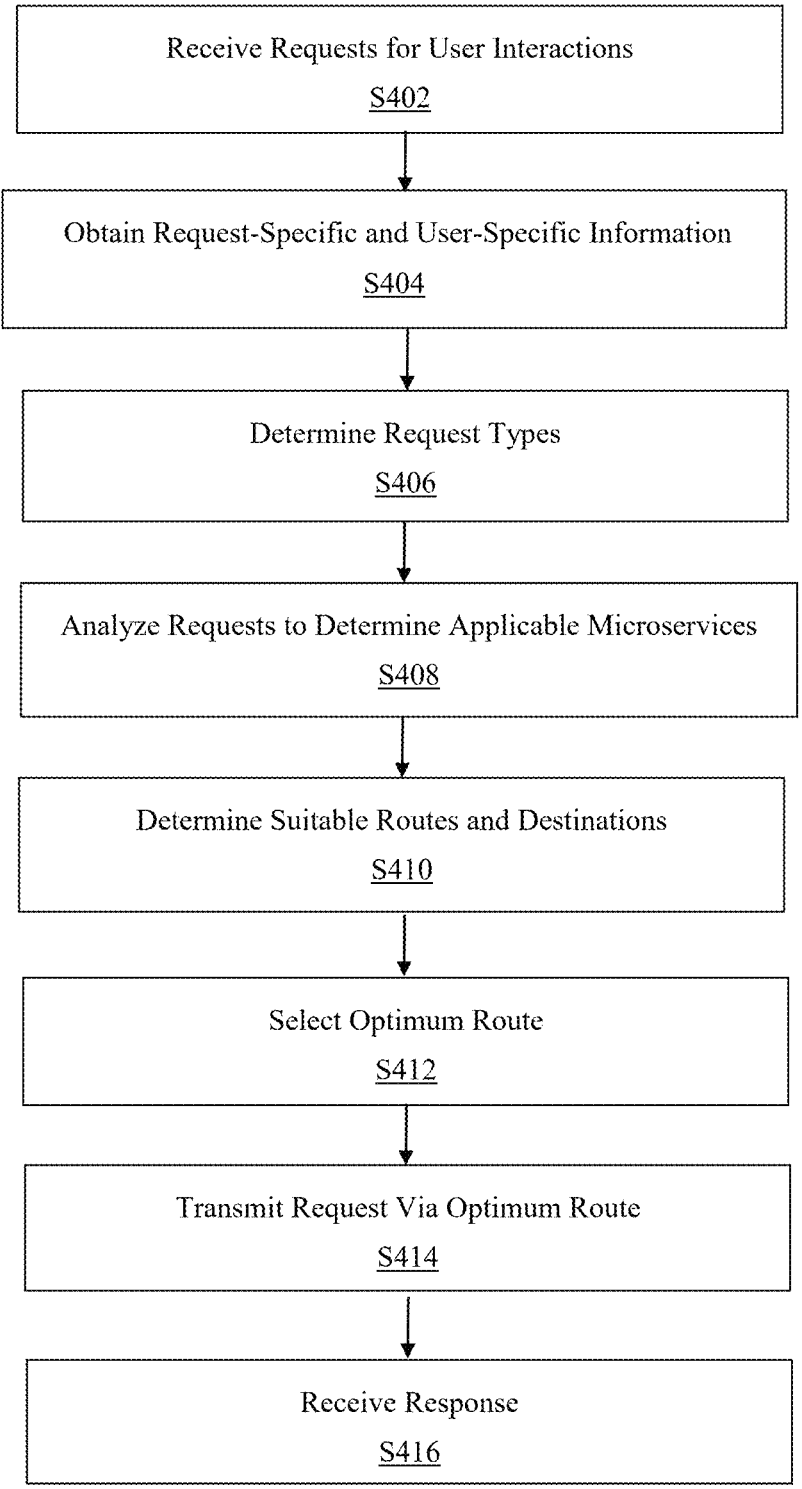
FIG. 4 is a flowchart of an exemplary process for implementing a method for handling large number of customer service interactions to ensure efficient and accurate interaction servicing results.

In process 400 of FIG. 4, at step S402, the interaction services routing and handling module 302 receives, from each of a plurality of users, a respective request for a corresponding interaction. At step S404, the interaction services routing and handling module 302 obtains request-specific information that relates to each respective request and user-specific information that relates to each respective user. In an exemplary embodiment, the interaction services routing and handling module 302 prompts each user to enter the user-specific information via a graphical user interface that is displayed on the screen of a client device 208.

Figure 5:
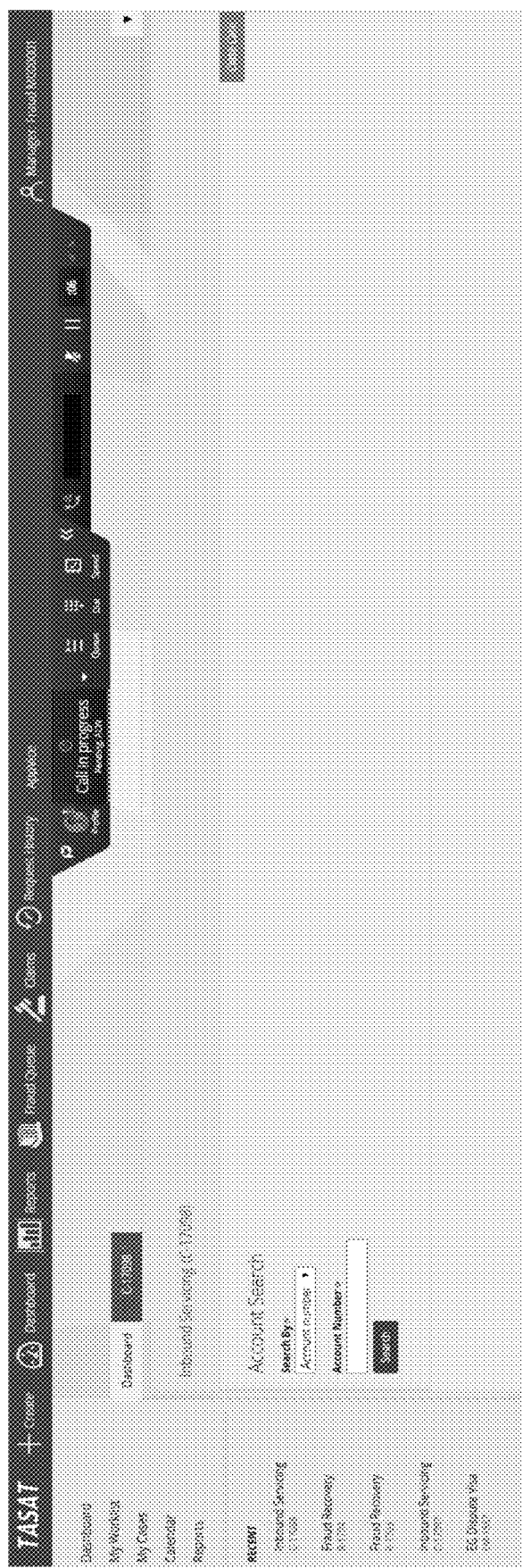
FIG. 5 is a first screenshot that illustrates a user interface for handling a customer interaction, according to an exemplary embodiment.
Figure 6:
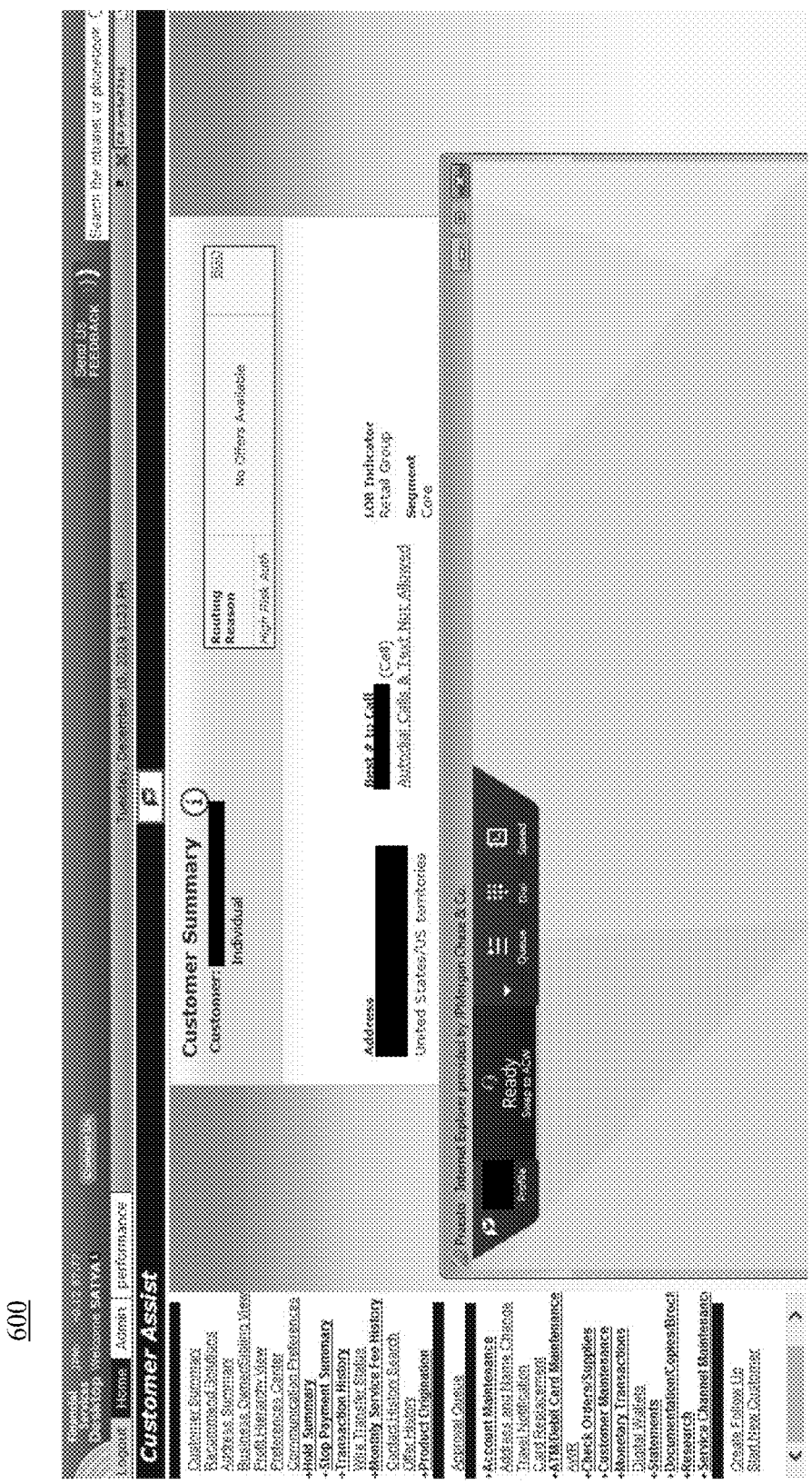
FIG. 6 is a second screenshot that illustrates customer identification information that is displayable on the user interface for handling a customer interaction, according to an exemplary embodiment.

Further, the interaction services routing and handling module 302 may also display, on a screen of the IDF device 202, a user interface for handling an interaction request that includes at least a subset of the request-specific information and at least a subset of the user-specific information. For example, referring to FIG. 5, a first screenshot 500 that illustrates a user interface for handling a customer interaction may include a task bar at the top of the screen, a trapezoidal-shaped ribbon that includes request-specific information and user-specific information at the top right-hand portion of the screen, a menu and a list of recent interactions along the left side of the screen, and status information relating to the current interaction request in the body of the screen. As another example, referring to FIG. 6, a second screenshot 600 that illustrates the user interface may include more details of the user-specific information, together with the trapezoidal-shaped ribbon shown in FIG. 5.

At step S406, the interaction services routing and handling module 302 determines, for each interaction, a request type for each respective request. The request type may indicate a communication mode by which a particular request is received. In an exemplary embodiment, the request type may include at least one of a voice request, an email request, an online chat request, a browser request, and a click-to-call request.

At step S408, the interaction services routing and handling module 302 analyzes, for each requested interaction, the request-specific information in order to determine at least one corresponding microservice and/or at least one microservice instance that is usable for handling the interaction. In an exemplary embodiment, the interaction services routing and handling module may determine more than one such microservice. For example, there may be any number of microservices that are suitable for handling different aspects of an interaction, such as two (2), three (3), five (5), ten (10), twenty (20), fifty (50), one hundred (100), or more such microservices; and some of these may have overlapping functions. As another example, there may be multiple microservice instances, which refers to using one particular microservice multiple times.

At step S410, the interaction services routing and handling module 302 determines at least one suitable route for transmitting the request-specific information and the user-specific information for each respective interaction to a respective destination that relates to the microservices determined in step S408. In an exemplary embodiment, for any given interaction, there may be more than one suitable route and more than one suitable destination, depending on the microservices to be used, and also depending on the order of using the microservices. As a result, the interaction services routing and handling module 302 may determine two or more suitable routes and/or two or more suitable destinations for a particular interaction. Then, at step S412, the interaction services routing and handling module 302 uses a metric that relates to workload distribution for selecting an optimum route; and at step S414, the interaction services routing and handling module 302 uses the optimum route for routing the information.

Figure 7:
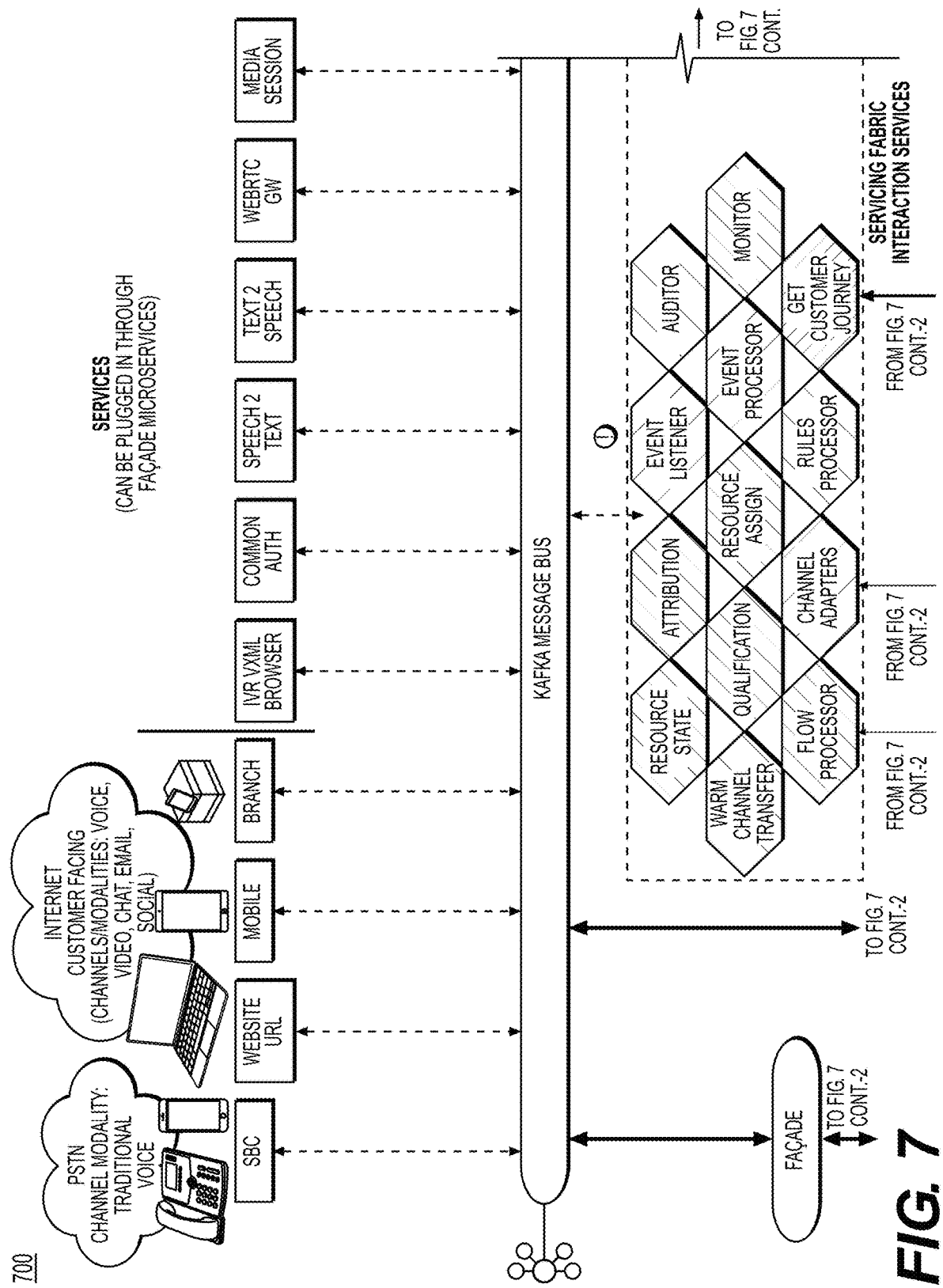
FIG. 7 is a diagram that illustrates a plurality of microservices and corresponding routing paths for implementing a method for handling large number of customer service interactions to ensure efficient and accurate interaction servicing results, according to an exemplary embodiment.
Figure 7:
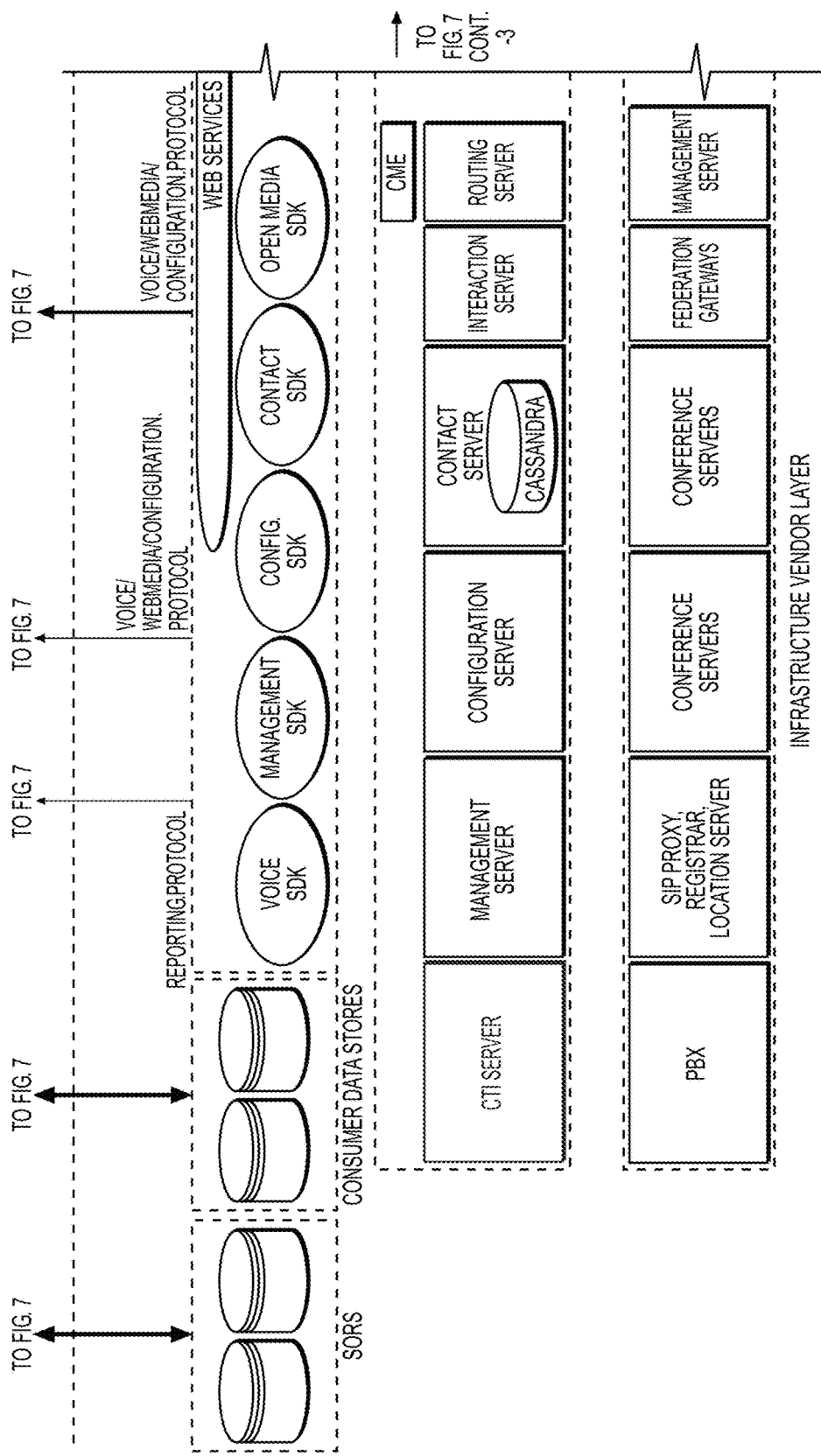
Figure 7:
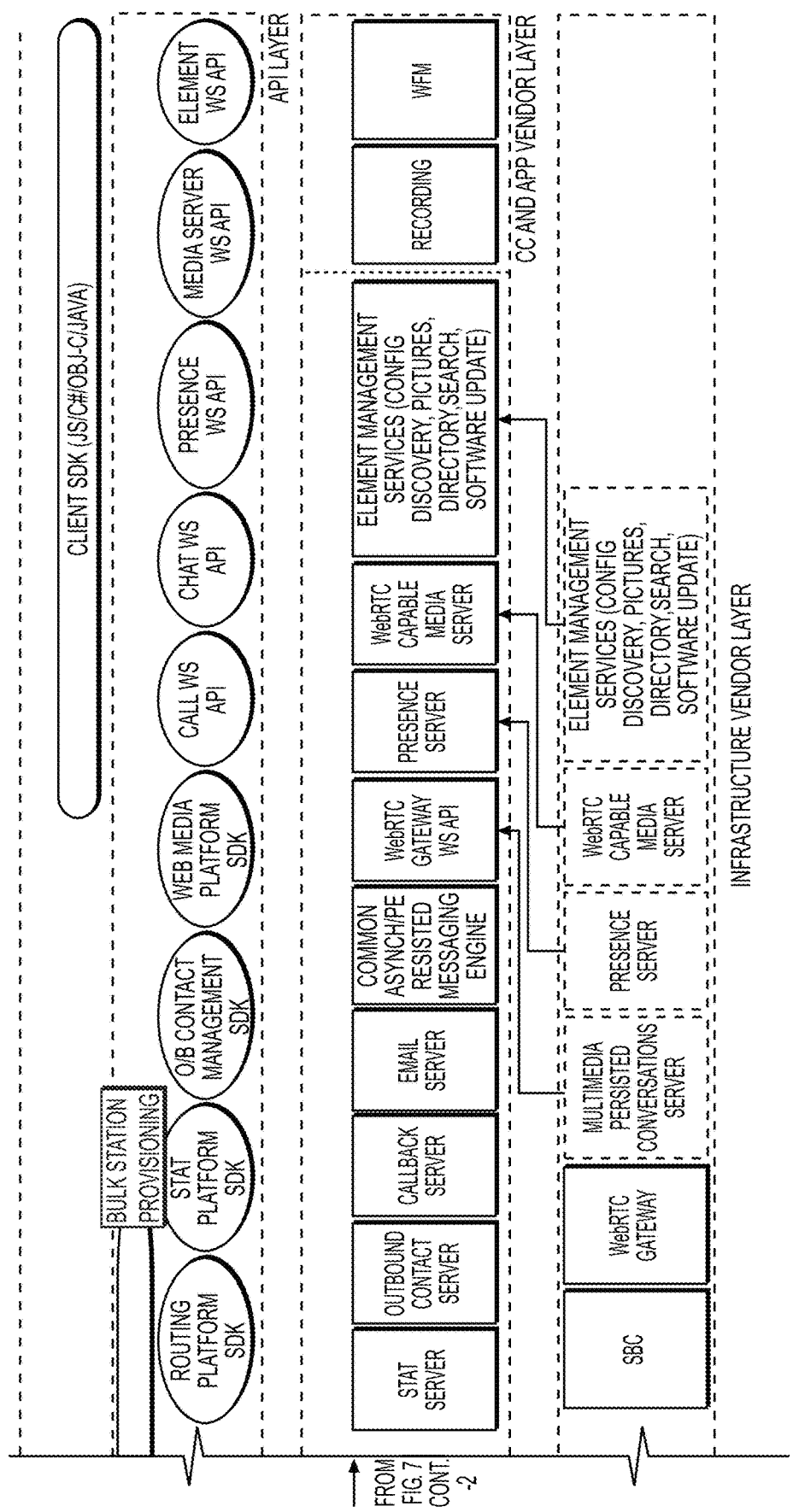

FIG. 7 is a diagram 700 that illustrates a plurality of microservices and corresponding routing paths for implementing a method for handling large number of customer service interactions to ensure efficient and accurate interaction servicing results, according to an exemplary embodiment. As illustrated in FIG. 7, a large number of microservices may be available for handling a particular request with respect to an interaction, including microservices having the following descriptors: "resource state"; "attribution"; "event listener"; "auditor"; "warm channel transfer"; "qualification"; "resource assign"; "event processor"; "monitor"; "flow processor"; "channel adapters"; "rules processor"; "get customer journey"; "specialist login"; "get specialist profile"; "get contacts"; "get communication history"; "receive voice & video call"; "invoke automated chat"; "invoke social"; "auditor"; "invoke simple chat"; "invoke conversation (multimedia)"; set disposition"; and "get customer journey".

Further, as also illustrated in FIG. 7 and in accordance with an exemplary embodiment, the microservices may be depicted in a honeycomb-type hexagonal pattern. In this manner the analyzing of a particular interaction effectively breaks up the associated tasks into relatively small pieces that correspond to different microservices. In an exemplary embodiment, a cloud native microservices-based implementation, such as Apache Kafka, is used, and in this construct, the honeycombs communicate with one other via events. The use of such an implementation provides several advantages, including the following: 1) Events must arrive in the proper order and must be scalable. 2) By partitioning the interactions, there is a low latency with respect to increasing or decreasing the number of microservices to be used (further noting that lower processing latency may be achieved by increasing the number of microservice instances). 3) By virtue of the ordering and the scalability of events, the interaction services handling module 302 achieves a higher throughput, thereby speeding up processing. 4) Load balancing and caching of IP addresses also contributes to higher processing speeds. 5) The ability to identify multiple redundancies in connections between microservices provides system resiliency and robustness. In an exemplary embodiment, events relating to a specific user session must be consumed in exactly the same order as the events were produced. Events relating to multiple user sessions need not be consumed, relative to each other, in the order in which they were produced. Distinguishing between events relating to a specific user session and events relating to multiple user sessions in this manner may facilitate a greater parallel processing capacity.

At step S416, the interaction services routing and handling module 302 receives response information that relates to a respective response for each corresponding request. In this aspect, in many situations, the received response effectively concludes the interaction.

In an exemplary embodiment, a cloud native microservice approach for an omni-channel contact center is provided. This approach includes decomposed contract bases microservices and a microservices-based event-driven architecture that resides in the cloud and is designed to have an elastic scale, high availability, and high resiliency, with a service level agreement (SLA) that is higher than 99.999%. The contact center is a real time (millisecond, sub-second latency) architecture that has an extensive intrinsic design. Groups of microservices are created in order to provide different aspects of functionality. The stack includes a platform as a service (i.e., microservices platform, such as, for example, Kubernetes or Cloud Foundry), Kafka scalable event messaging and streaming technology, Cassandra, NoSQL performant private database for microservices, and distributed in-memory grid technologies such as, for example, Cloud Cache, for storing quickly accessible state information.

The general architecture includes a facade layer of microservices adapting to external vendor elements through predetermined protocols, and normalizing the communication to fit a highly available, concurrent processing, resilient, large-scale, event-based communication Kafka Topics for ordered events to consuming instances of microservices; client-facing microservices which consume raw Kafka events from façade microservices and provide discrete functional services with a client-facing application programming interface (API)—RESTful Web Services; a general purpose notification service that provides a bidirectional low latency event exchange mechanism between clients (e.g., single user web clients) or server applications (e.g., fraud ecosystems, voice biometric systems, analytics, and/or recording systems); web clients following microservices architecture with user interface (UI), software development kit (SDK), and Services architecture using Angular8 frameworks; drop-in concept for specialist phone control applications into various servicing applications delivering a computer telephony integration (CTI) container with all of the functionality included therein; programmatic APIs for screen pop; and standalone ribbon. Clusters of microservices are provided for core servicing fabric telephony and agent login; automated specialist provisioning across multiple vendor solutions for orchestration, routing, recording, voicemail, and other functionalities; specialist phone control; and real-time dashboard for contact center supervisory personnel.

In another exemplary embodiment, a client ribbon embedding mechanism that is suitable for a large scale deployment and integration with key value pairs (KVPs) for screen pops is provided. The client ribbon embedding mechanism includes a self-contained feature set that is extensible to omni-channel without requiring extensive deployment and knowledge of CTI protocols and APIs by non-contact center developers. The mechanism creates a lightweight approach to integrating contact center specialist features into the servicing application, thereby providing a quicker rollout, reduced integration effort, and automatic updates for easier maintenance. The mechanism includes standardized integration patterns and a cookbook recipe approach, and provides a way to obtain integrated features required by servicing applications. These features may include: screen pops; updating customer relevant data; end call tracking; state change tied to case disposition; transfer and conference events; customized call notifications; and enabling key value observers (KVOs) to be updated by servicing applications, middleware, and fraud authentication systems.

In yet another exemplary embodiment, a Kafka usage for converting stateful ordered events to stateless, scalable eventing in real time is provided. The design includes concurrent data-center (DC) and Availability Zone-specific active and backup topics on multiple Kafka clusters in order to handle catastrophic Availability Zone failures. In an exemplary embodiment, an Availability Zone refers to an instance of the cloud platform so that multiple Availability Zones within a DC provide resiliency in the event of a failure of a single Availability Zone (e.g., a bad network router). Other features include cross-DC Kafka events to provide a telephony service that is abstracted from an affinity to one of many DC's. The use of a Kafka routing key that is tied to directory numbers (DNs) and design in partitioning may also be provided, in order to cause ordered events to go to particular consumers in a scalable manner. A sticky Kafka partition assignor to reduce latencies when the cloud system automatically scales up or down may also be provided, for overcoming a need to rebalance and/or reseed on multiple hops that may otherwise introduce latencies. A sequential thread executor may also be provided to distinguish between events that may be processed in parallel from those that must be processed sequentially.

The Kafka usage may include a sticky Availability Zone-aware Kafka partition assignor to enable a cloud system to automatically scale up or down despite Availability Zone affinities, which require each message to be processed by an instance within that Availability Zone that would otherwise fail or be inefficient outside of that Availability Zone. The sticky Availability Zone-aware Kafka partition assignor is designed to minimize churn while allowing an application to reserve a partition in order to avoid any impact while scaling up. The sticky Availability Zone-aware Kafka partition assignor may also cause partitions to stick to respective Availability Zones so that affinities to each Availability Zone are unaffected during rebalancing.

The Kafka usage may also provide for handling affinities at the edge of the cloud where only one instance can process a particular message but Kafka has only crude routing capabilities. In this aspect, an application instance with an affinity, such as, for example, a web-socket to a specific client, supplies the client with a subscriptionId that happens to also be a Kafka routing key that guarantees that all messages sent to that client from back end services arrive, within a single hop, at the correct application instance. The application had previously reserved a partition, calculated as at least one universally unique identifier (UUID) that routes to the partition, so that the UUID(s) can be offered on demand to clients as subscription IDs.

The Kafka usage may also provide for multi-threading of the consumption of messages per Kafka partition while maintaining strict message ordering. In this aspect, for the vast majority of application, ordering only has meaning for messages produced with the same routing-key. Thus, the Kafka usage may be designed to process all messages received from a partition in parallel except for those messages with the same key which must be processed sequentially.

In still another exemplary embodiment, resiliency patterns and a client discovery service designed to overcome global load balancer (GLB) latencies is provided. Browsers and client desktops cache domain name system (DNS) resolution of uniform resource locators (URLs), and when the backend services or Availability Zones experience failures, the clients continue to attempt to generate requests to the same defunct destination. In such deployments, where no performant IP sprayers or gateways exist and where millisecond latency SLAs exit, there may be a disruption in the continuous availability of services. In this aspect, a client side resiliency that complements the multi-Availability Zone, multi-instance, and multi-data center availability for instant seamless connection is provided. The client first discovers services and capabilities, including backup Availability Zone URLs, according to current availability and user authorization. The discovery service provides intelligent backup URLs for stateful services, stateless services, and external server systems. A client software development kit abstracts the resiliency, rehydration, and reconnection logic, begins network recovery, and then does a seamless login. The client user interface automatically recovers from the loss of a websocket or failure of a cloud microservice in an Availability Zone.

In yet another exemplary embodiment, resiliency patterns and seamless resiliency of stateful, low latency telephony clients across multiple data centers (DCs). In each data center, stateful edge services monitor each extension (i.e., domain name) simultaneously from different instances on both Availability Zones, thereby providing both instance and Availability Zone resiliency. Such services may use a deduper that receives events from both Availability Zones but propagates only one Availability Zone. For phone resiliency extension (domain name) may move from one data center to another, and the servicing fabric in both data centers may detect the move and direct requests to the new data center. Failure to login causes a resynchronization of the phone state in both data centers, thus self-healing in case discovery becomes out of synchronization.

The following table provides a list of features and specific aspects thereof:

| | | | | |
|---|---|---|---|---|
| Stateful Domain | Stateful→Stateless | Bidirectional WebSocket | Dealing with Vendor Egress High Affinity connections | Follow the Phone - DR failover |
| Low Latency | Minimize Latencies through colocation | Select Blazing fact Technologies | Highly concurrent connections: vendor systems & clients | Custom Sticky Kafka Partition Assignor |
| Stack HA | Provide High Availability (HA) of CaaS, Kafka clusters under the cover | Leverage nascent resiliency in stack | Event Starters encapsulate High Availability (HA) | Standby Data Center (DC) Promotion |
| Load Balancing | Circuit Breaker Patterns: for end-user client and server-to-server (API2API) invocations, with backup Availability Zones | Connection to Global Load Balances (GLBs) for non-cloud servers | Phone and queue monitoring load balanced across a DC | Data extractions load balanced across Data Centers (DCs) |

| | | | | |
|---|---|---|---|---|
| Black Availability Zone Failure | Client Side Recovery (Web Socket disconnect, Availability Zone failure, app failure) | Kafka moves all load to other Availability Zone in less than 3 sec | Subscriptions replicated across Availability Zones | SDK connects to other Availability Zone |
| Grey Availability Zone Failure | AZ aware Sticky Partition Assignor isolates network issues in Availability Zones | Multiple layers of defense for grey failures | OAUTH2 Authorization across multiple Availability Zone environment | Cloud Config Server has all the bootstrap info, Prod: Bitbucket |

In still another exemplary embodiment, defense mechanisms for handling grey failures in the cloud are provided. A first defense mechanism is a sticky partitioner that is designed to handle a scenario in which one Availability Zone is bad, and even while sharing the same Kafka and Cassandra across two Availability Zones, events would zigzag across applications in the two Availability Zone, thereby increasing the probability of a grey failure when any microservice in a second Availability Zone begins to go bad, and also affecting all traffic. The sticky partitioner addresses this scenario by isolating network issues in Availability Zones by primarily routing the events to the same Availability Zone, thereby ensuring that 50% of the traffic is not affected by an unhealthy grey Availability Zone.

A second defense mechanism is the use of multiple levels of defense for grey failures so that a single failure does not equate to a request failure as it is retried across other Availability Zones and/or other mechanisms. For example, for a scenario in which an external server application issues a request to an Availability Zone that is only partially able to service the request, thereby resulting in a failure, this defense mechanism is designed to propagate all information available for servicing the request in a second attempt on another Availability Zone. If the second Availability Zone is able to find the remaining missing data from the first Availability Zone, then the second Availability Zone processes the request.

A third defense mechanism is the use of multiple layers of defense for grey failures for stateful applications so that a single failure does not equate to a request failure as there are multiple resiliency designs at each stage of the microservice in order to ensure servicing the request. For example, for a scenario in which a ribbon login fails because a CTI extension monitoring had failed or was interrupted, or because the request was routed to the wrong Availability Zone, or because the domain name is not in service, this defense mechanism is designed to perform several functions, including the following: CTI monitors domain name changes at all times; domain name in-service and out-of-service events are propagated across both data centers; if the login attempt comes to a data center where the domain name is out of service, CTI will ask the other data center's CTI to publish if the domain name is in service in that data center; repeat a set up from scratch for failed connections for some CTI domain names; delegate some failed connections for some CTI domain names from one CTI to a backup CTI; and recovery code in ribbon client to go into retry mode and determine when the domain name status changes, thereby self-healing.

In yet another exemplary embodiment, high efficiency reliable bidirectional messaging for low latency applications is provided. This embodiment includes several features. A first feature is an ability to send a Kafka event direct to the instance hosting the web-socket for the final leg of delivery with a minimum possible latency. This is achieved by calculating a UUID that maps to a partition owned by the notification-service instance so that all messages sent using that UUID as a Kafka routing key are delivered directly to the correct one of many notification-service instances.

A second feature is an ability to scale up a number of instances without any latency nor disruption to existing web-socket users. This is achieved by using a custom stick partition assignor whereby the consumer is guaranteed that one partition is never removed. This also avoids two-hop routing.

A third feature is load balancing of system-wide events to another ecosystem through stateless, load balanced, randomized delivery on any of the web-sockets (WS). This feature provides an ability to load-balance events that can be consumed by a group of web-socket clients. This is achieved by allowing each member of a load-balancing (LB) group to subscribe with the name of the LB group so that future messages received by a notification service on a UUID that belongs to the group can be delivered to any member.

A fourth feature allows for more than one web-socket to be part of a high availability (HA) group to ensure low latency and guaranteed delivery on a surviving web-socket. This feature provides an ability to support clients that require a highly available pair of web-sockets where ordered events are delivered via an "active web-socket" only, and when it fails, the surviving web-socket is immediately promoted to being active. Thus, a latency that would have occurred without the HA group is completely avoided. Meanwhile, the client will initiate a new backup web-socket. To protect against failure or down-scaling, upon receiving a new web-socket request with an HA group identification, the corresponding notification service will reject a request to create a second web-socket in the same HA group on the same instance.

A fifth feature provides an ability to support message delivery from clients in multiple Availability Zones. This is achieved by using Kafka's native ability to route messages using a routing key so that the producer of the message only needs to know the Kafka cluster address.

A sixth feature provides an ability to subscribe anywhere, replicate everywhere, and notify anywhere. This feature further provides an ability to support message delivery from clients in multiple data centers (DCs) whereby when a message is received in one DC where the UUID is not recognized, the notification service will query a database to determine the Kafka cluster associated with the UUID so that the message is delivered in a second hop. In this manner, the client need not be concerned with the DC affinity of the web-socket.

A seventh feature provides an ability to act as a durable message provider by which no messages are lost. This feature further provides an ability to cache events in case a client is temporarily absent, providing a fire and forget service for microservices. This is achieved by caching undeliverable events for a configurable amount of time after a web-socket disconnects. On reconnection, the client will present, via a web-socket message, an identifier that maps it to the previously used UUID, and the notification service will then deliver all cached messages before continuing with normal message delivery.

An eighth feature provides a client side home Availability Zone, which allows clients to receive events more quickly by directing them to a more efficient Availability Zone. The efficiency is improved through locality, speedier delivery of events for co-located microservices, and Kafka, together with vendor gear for a particular user.

A ninth feature provides a common utility framework to notify any client independent of any type of microservices (i.e., a sender of an event). The common utility framework manages the client notification channel and is a common utility for services, thus abstracting them from the delivery details.

A tenth feature provides client session management via termination lifecycle events, which are being sent to all microservices. An eleventh feature provides abstracting of the Kafka resiliency architecture (e.g., dual DC or standby DC) via a mere web-socket delivery.

Taken together, these features provide additional advantages, including the following: First, ribbon clients were preferred not to talk to Kafka because it would require a partition for each user, but an excessive number of partitions would not be supported by Kafka, because of a lack of scalability, or else users would receive events that were intended for other users. Second, web-sockets are used for low latency, but the present embodiment uses a common web-socket towards a client, and routes all events from various microservices on the same channel.

There are many scenarios where a client sends requests to a single IP Address repeatedly even though the services are down. This could be due to local DNS resolution caching, and could also be due to delays caused by the time taken for GLBs to detect the services being down.

The latencies in the above-described scenario disrupt telephony communications due to the nature of real time low latency communication. Despite providing resiliency for multiAvailability Zone/multi-data center microservices, clients send requests to the services that are down, due to local DNS resolution caches, for 20 minutes or more, depending on the operating system and browser settings.

Defense mechanisms for handling grey failures in cloud; resiliency for grey failures: Grey failures are defined as partial failures in an application that seems to be running well from a regular health check point of view. Some requests succeed, while others do not. Grey failures can occur in the network or when contacting downstream applications, or communicating with databases, or in other circumstances.

State of the art may address black and white failures, but grey failures may only be partially addressed through centralized monitoring.

Microservices-based architectures and event drive architectures increase the chances of grey failure. By increasing the number of instances through a microservices approach, there are inherently multiple hops over the network that need to all complete successfully for a complete transaction. If key components of the solution, such as, for example, network routers, have a small error rate, then the overall error may increase exponentially.

In an exemplary embodiment, the present disclosure provides a solution by which high levels of service availability may be maintained in the face of grey failures within a microservices deployment.

Availability Zone Aware Sticky Partition Assignor: Cloud deployments increase their uptime by executing multiple instances of each application so that if any one instance fails, other instances are available to take over the load. The uptime is increased further by guaranteeing that multiple instances are located in multiple Availability Zones (AZ) (also referred to herein as a "Availability Zone"), such that if an AZ fails all instances in that AZ are lost, but instances in other AZ(s) are still available to take over the load.

This deployment model is ideally suited to scenarios where the "failures" are absolute (i.e., an AZ is either functioning perfectly or not at all), or if there is just one application. If the deployment involves multiple applications that message each other, then a partial failure in one Availability Zone will have a ripple effect to the other Availability Zone. If the deployment has many layers of applications, each of which message each other, then a partial failure in one AZ is likely to affect the majority of transactions that flow through each application layer.

Figure 8:
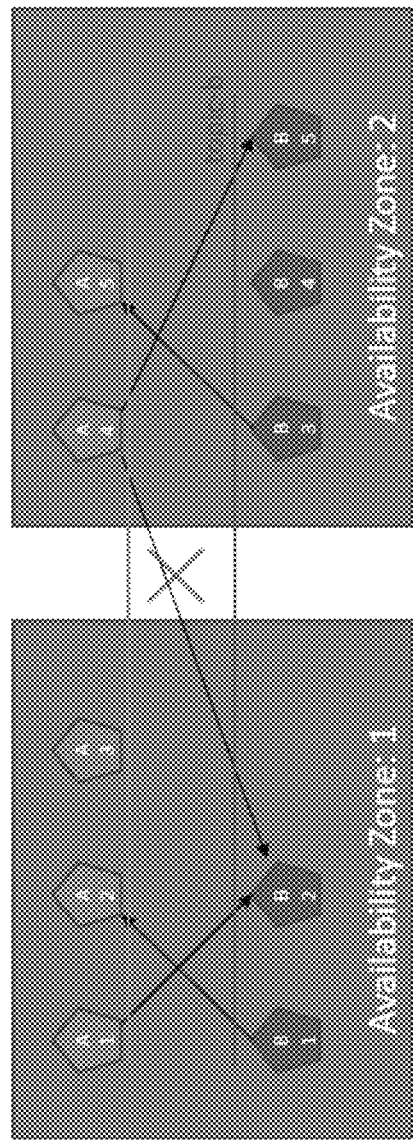
FIG. 8 is a diagram that illustrates a grey failure phenomenon in a telephony communication system, according to an exemplary embodiment.

FIG. 8 is a diagram 800 that illustrates a grey failure phenomenon between two Availability Zones in a telephony communication system, according to an exemplary embodiment. Referring to FIG. 8, a mechanism is provided that causes transactions to remain within the AZ oar which they began, unless all instances of an application within that AZ have failed. There is no restriction on the number of instances of each application in total or per AZ. All topics must have the same number of partitions. In the example illustrated in FIG. 8, application A consumes from topic-a which has 20 partitions, is scaled to three (3) instances in AZ:1 and two (2) in AZ:2, and application B consumes from topic-b which has 20 partitions, is scaled to two (2) instances in AZ:1 and three (3) in AZ:2.

The goal of the Availability Zone Aware Sticky Partition Assignor is to use a deterministic algorithm that always assigns the same subset of partitions in every topic to instances in the same AZ. When all application instances within an AZ have the same partitions, then when applications route messages to each other using the same routing-key, the messages are guaranteed to remain within the AZ because a given routing key always maps to the same partition.

Example Flow: 1) An application on any AZ receives a REST request to perform an action, such as, for example, A4 in FIG. 8. 2) The application may return a provisional response, identifies an ID that represents the transaction, converts the REST request into a Kafka request and sends the message to itself using the ID as routing key. 3) An instance (for example, A2 in FIG. 8) of the application consumes the message in the AZ that will be responsible for processing the transaction as it flows through multiple application layers. The application will process the message and produce additional messages to one or more other applications using the same routing key. 4) An instance of another application (for example, B2 in FIG. 8) consumes the request sent in the previous step. It is guaranteed to be in the same AZ. It may need to propagate the request to other "downstream" applications and if so, uses the same routing key. 5) It propagates a response back to the application that sent it a request and uses the same routing key. 6) The response is consumed in the same AZ that sent the request. Furthermore, the response is usually consumed by the same instance of the application.

Figure 9:
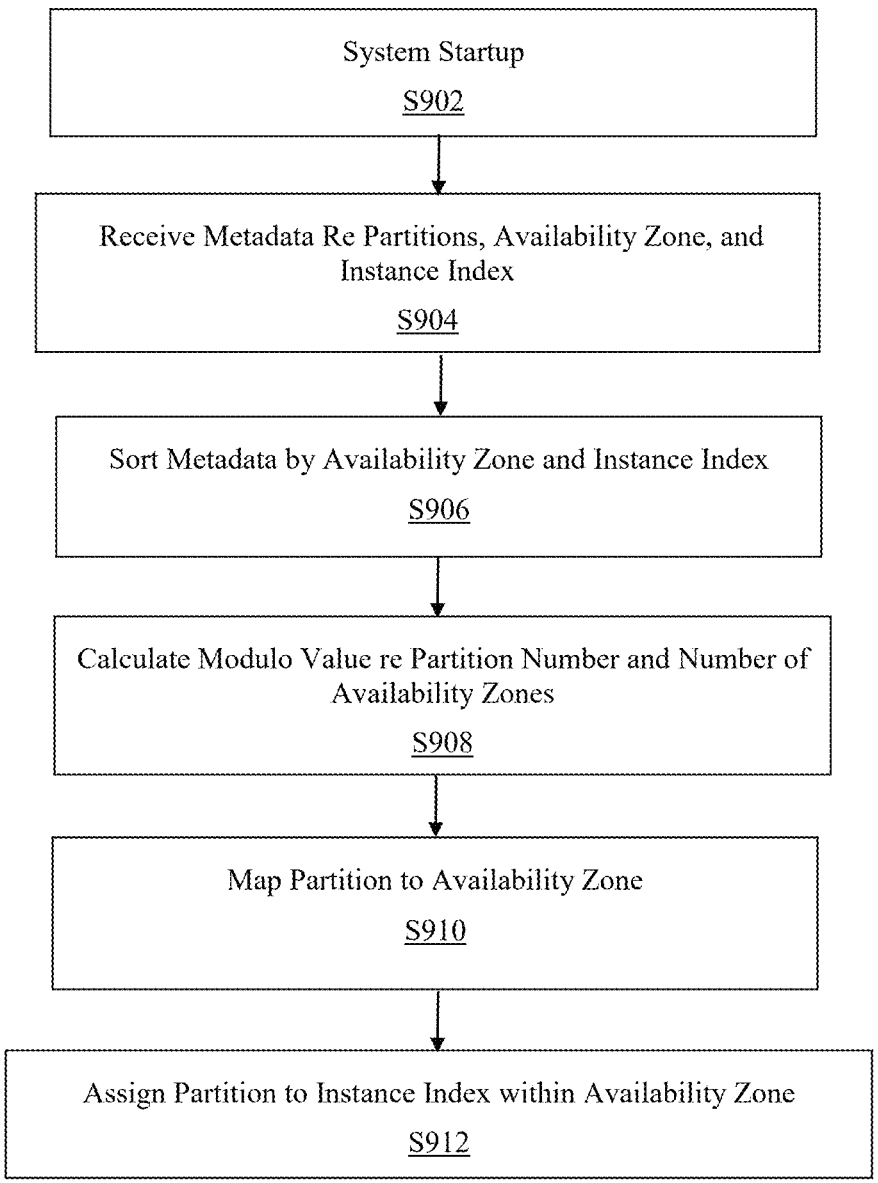
FIG. 9 is a flowchart of a method for overcoming a grey failure in a telephony communication system, according to an exemplary embodiment.

FIG. 9 is a flowchart 900 of a method for overcoming a grey failure in a telephony communication system, according to an exemplary embodiment.

Referring to FIG. 9, the following is an algorithm for overcoming a grey failure: 1) On notification that a partial failure has occurred and a rebalancing is to be performed, the existing message bus requests every instance in the consumer-group to supply metadata (operation S902). The protocol does not specify for format of the metadata so that custom partition assignors can be invented to use their own algorithms. In an exemplary embodiment, each application returns metadata describing 1a) the partitions that it wants to retain in order of priority; 1b) the AZ-index in which it is located; and 1c) its application instance index within the AZ (operation S904). 2) The existing message bus assigns the role of PartitionAssignor to one of the instances of the application. This instance, which may be in any AZ, receives metadata for all members of the group and is required to assign partitions using an algorithm shared by all members of the group. In an exemplary embodiment, the assignor 2a) sorts the group members by AZ and then sorts by AZ instance-index (operation S906); 2b) creates place holders for AZ indices that do not have any group members; 2c) iterates through all partitions. For each partition verifies that it is already assigned to a group member and if not, assigns it to an AZ according to mod (p,Z)=z where "p" is the partition number, Z is the total number of availability Zones and modulo is a standard modulo function (i.e., returns the remainder of a division), and "z" is the zone index (operations S908 and S910); 2d) iterates through all AZ's and assigns any partitions from the previous step that were allocated to the AZ but not to a specific instance (operation S912). The assignment to individual instances is normally given to the instance with fewest partitions. If there are no instances in the AZ, then this step is skipped; and 2e) iterates through all AZ's for unassigned partitions and assigns it to the AZ with few partitions, and then the instance within the AZ that has fewest partitions.

Delegation of request to peer in another AZ: If an instance fails to process a request that it deems to be valid because of a known error condition, such as loss of connectivity to a downstream resource, then the instance may delegate the request to another instance in another AZ. This scenario occurs when the resource has not self-terminated because it can access some other downstream resources, just not the particular resource required for this request. Delegation can be achieved using an AZ specific topic where only instances in that AZ consume from the AZ-specific topic.

Avoid failing a request due to incomplete local information: In cases where data derived from one or more sources is replicated between AZs, occasionally some information is lost or is not yet available when required to service a request. Rather than failing the request, this error condition may be handled by creating a message that contains the source AZ, all of the request information, and whatever information is available locally in order to process the request and then propagating the message to another AZ using an AZ-specific topic. When the other AZ consumes the message, it attempts to retrieve the missing data from its locally available information. If there is still not enough information to service the request, it may repeat the process so that the message contains a list of AZ's at which the request was already attempted. It will not send the message to an AZ in that list. The first AZ to gather all information to process the request will do so.

In accordance with a variant exemplary embodiment, AZ's that contain information that was not present in the received message may send the missing information to the AZ in order to self-heal.

Availability Zone Health Monitoring: By comparing the health of each AZ with other AZ's, it may be possible to route traffic away from the least healthy AZ. In the case of a grey failure within an AZ, it is not necessary to identify the cause of the failure in order to avoid it.

Examples of root causes may include: 1) Excessive latency to an overloaded resource where timeouts occur before a request can be processed. 2) Network issues experienced by or all instances of a back-end microservice. 3) AZ certificate expiry. 4) Credentials expiry.

Figure 10:
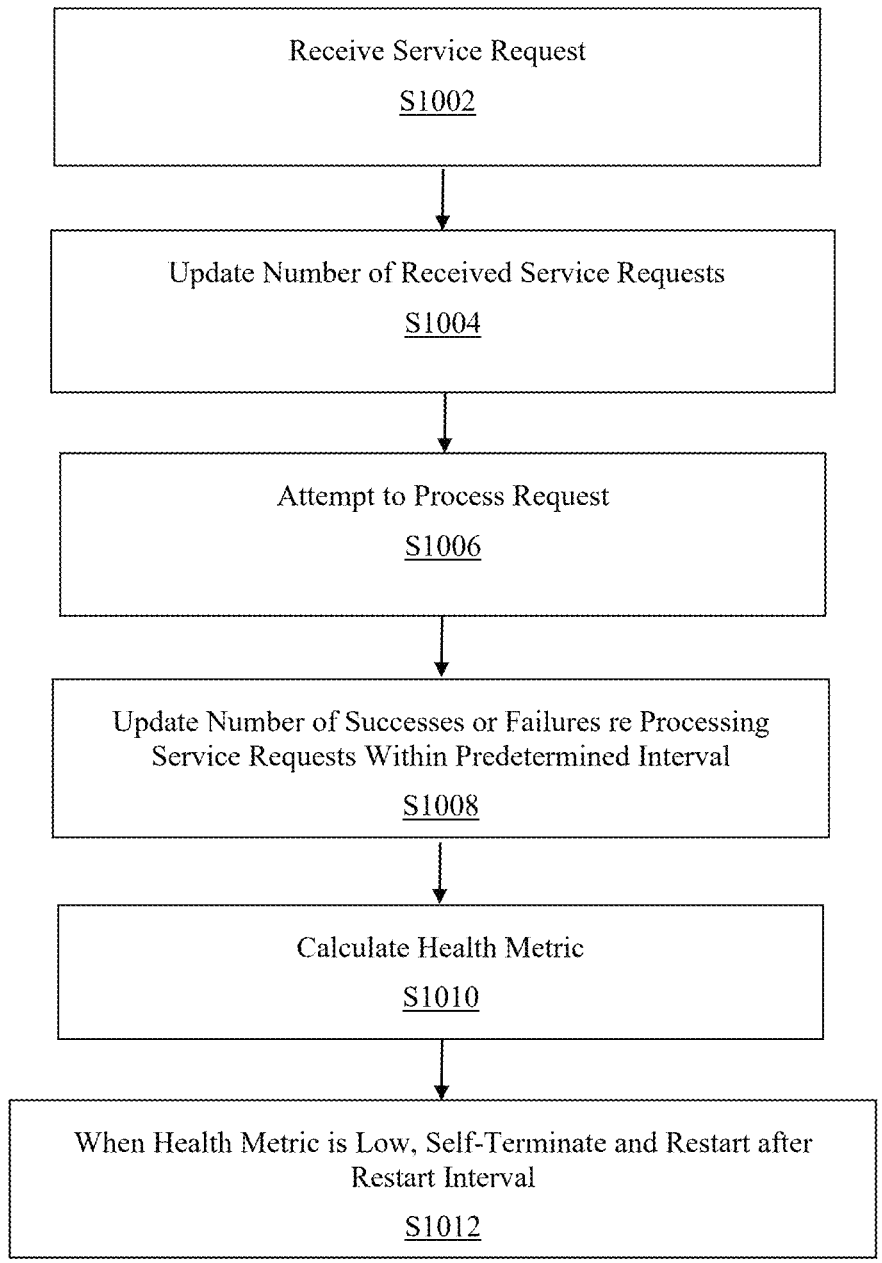
FIG. 10 is a flowchart of a method for overcoming a grey failure in a telephony communication system, according to another exemplary embodiment.

FIG. 10 is a flowchart 1000 of a method for overcoming a grey failure in a telephony communication system, according to another exemplary embodiment In an exemplary embodiment, the following process may be executed to address such grey failures: 1) AZ-1 receives a request (operation S1002) and increments a request-received counter (operation S1004). It attempts to process the request (operation S1006) and may respond to the request or send the request to a downstream service. 2) The downstream service increments its request-received counter and may respond to the request or fork the request to one or more downstream services. 3) A service that completes processing of the request will record the result in its request-succeeded or request-failed counter before responding (operation S1008). 4) A service that receives a response from a downstream service will record the result in its request-succeeded or request-failed counter.

The front end microservice exposes an API which returns the percentage success rate in a particular recent time interval. Clients of this service may decide not to attempt further requests at this AZ until the AZ health percentage is close to that of peer AZ's. Clients need not be concerned about Which layer in the AZ was responsible for the failure.

In a variant exemplary embodiment, each AZ compares its health to the health of other AZ's and self-terminates if its health falls below the average health by a configurable threshold. The AZ may record the number of times the threshold has been breached as a running average of the previous interval (e.g., one minute, ten minutes, one hour, or one day) in order to avoid unnecessary and unhelpful terminations (operation S1010).

Application Instance Health Monitoring: Cloud best practice requires that an application automatically self-terminate and restart if unable to perform its function. Grey conditions where an application is able to perform some of it role requires an algorithm for optional system performance.

In an exemplary embodiment, the following procedure may be executed for application instance health monitoring: 1) Each application instance records the number of requests that it has received and the number that were successful and unsuccessful. The recording should be a running average for one or more intervals such as the last one minute, ten minutes, one hour, one day, and/or any other suitable interval. 2) Each application periodically checks its health as compared to the health of other application instances in the AZ. It self-terminates if its health falls below the average health by a configurable threshold (operation S1012). 3) If the application is not able to access the shared database in order to determine the health of its peers, then the application may restart after a configurable period of time.

In a variant exemplary embodiment, the health and number of restarts of all instances within an AZ for a given application may be considered as compared to the collective application health of other AZs. If the health of an application in a particular AZ is lower than the collective health of the application in other AZ's, then all instances of the application in the underperforming AZ may be permanently stopped so that they do not automatically restart until the underlying issue is resolved.

Accordingly, with this technology, an optimized process for handling large number of customer service interactions to ensure efficient and accurate interaction servicing results is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally; the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for overcoming a partial failure of an application in a telephony communication system, the method being implemented by at least one processor, the method comprising:

receiving, by the at least one processor from each respective application instance of a plurality of application instances, metadata that relates to a corresponding ordered priority of partitions, a corresponding Availability Zone from among a plurality of Availability Zones in which a corresponding application is located, and a corresponding application instance index within the corresponding Availability Zone;

sorting, by the at least one processor, the received metadata with respect to the corresponding Availability Zone and with respect to the corresponding application instance index;

assigning, by the at least one processor based on a result of the sorting, each respective application instance to a corresponding partition index within the Availability Zone in which the corresponding application is located such that a number of the partitions within other application instances in the corresponding Availability Zone is evenly balanced; and when a number of application instances within the corresponding Availability Zone changes, reassigning, by the at least one processor based on a result of the sorting, each respective application instance to a corresponding partition index within the Availability Zone in which the corresponding application is located such that a number of the partitions within other application instances in the corresponding Availability Zone is evenly balanced.

2. The method of claim 1, wherein the assigning comprises:

assigning each particular partition to a particular Availability Zone.

3. The method of claim 2, wherein the assigning of the particular partition to the particular Availability Zone comprises calculating a modulo value with respect to an integer number of the particular partition and an integer number of the particular Availability Zone within the plurality of Availability Zones.

4. The method of claim 2, further comprising:

after the particular partition is assigned to the particular Availability Zone, assigning the particular partition to a particular application instance index within the particular Availability Zone.

5. A computing apparatus for overcoming a partial failure of an application in a telephony communication system, the computing apparatus comprising:

a processor;

a memory; and a communication interface coupled to each of the processor and the memory, wherein the processor is configured to:

receive, via the communication interface from each respective application of a plurality of applications, metadata that relates to a corresponding ordered priority of partitions, a corresponding Availability Zone from among a plurality of Availability Zones in which the respective application is located, and a corresponding instance index within the corresponding Availability Zone;

sort the received metadata with respect to the corresponding Availability Zone and with respect to the corresponding instance index; and reassign, based on a result of the sorting, the first application to an instance index within the Availability Zone in which the first application is located such that a number of the partitions within instance indexes in the corresponding Availability Zone is balanced.

6. The computing apparatus of claim 5, wherein the processor is further configured to:

determine whether each of the partitions is assigned to an Availability Zone; and when a determination is made that a particular partition is not assigned to an Availability Zone, assign the particular partition to a particular Availability Zone.

7. The computing apparatus of claim 6, wherein the processor is further configured to assign the particular partition to the particular Availability Zone by calculating a modulo value with respect to an identification number of the particular partition and a number of Availability Zones within the plurality of Availability Zones.

8. The computing apparatus of claim 6, wherein the processor is further configured to:

after the particular partition is assigned to the particular Availability Zone, assign the particular partition to a particular instance index within the particular Availability Zone.

* * * * *